United States Patent Office 2,847,176
Patented Aug. 12, 1958

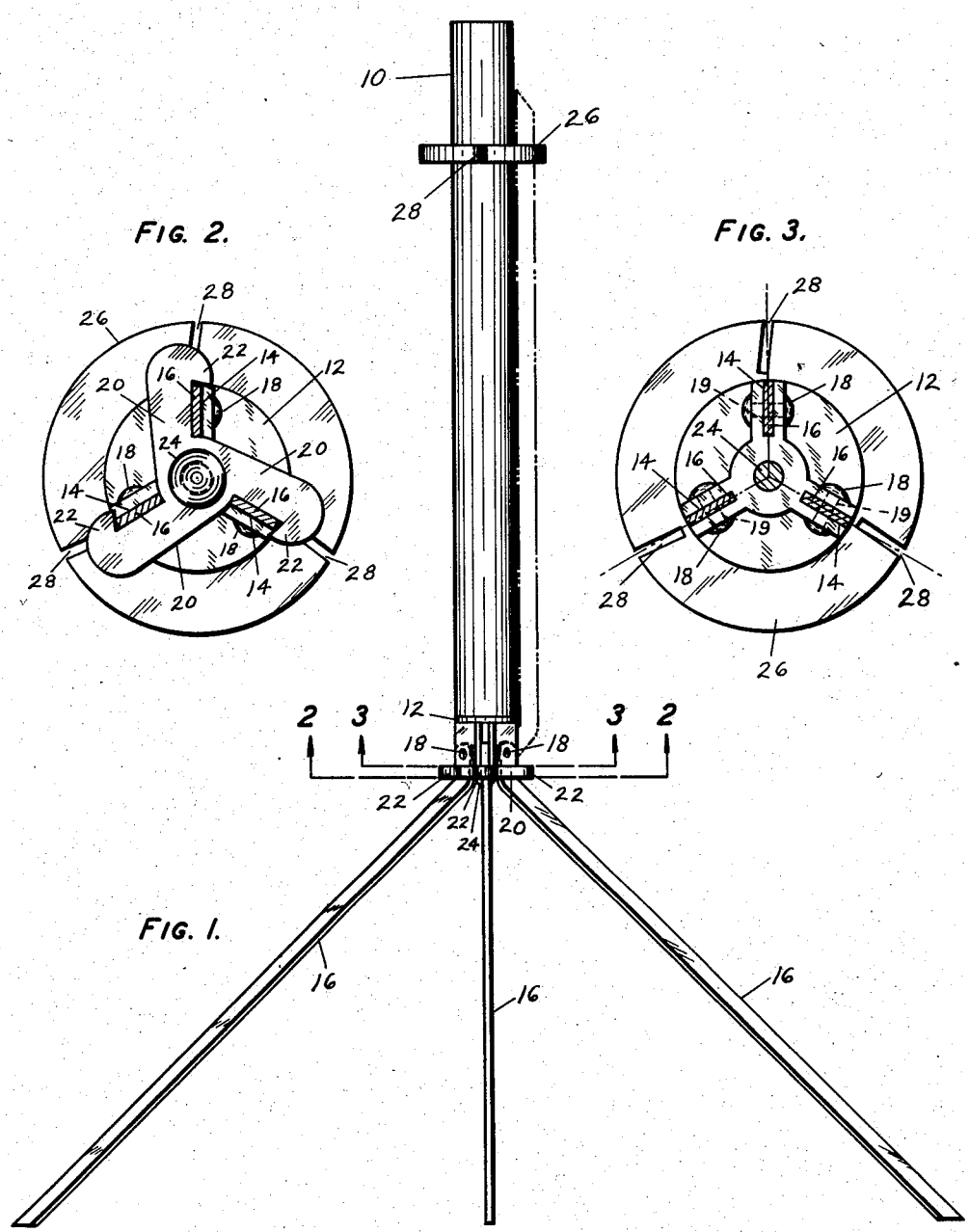

2,847,176

COLLAPSIBLE STANDS

John Thomas Phillips, Wichita, Kans.

Application December 19, 1952, Serial No. 326,895

5 Claims. (Cl. 248—170)

This invention relates to improvements in collapsible stands. More particularly this invention relates to improvements in stands wherein the legs fold into parallel relation with the support for storing.

It is therefore an object of the present invention to provide an improved stand wherein the legs can be folded into parallel relation with the support for storage.

It is frequently desirable to provide a stand which can collapse for storage and carrying but which can be extended to enable it to be sturdy and to support itself in vertical position. Such stands customarily have legs which fold, which are hinged, or which slide along the length of the support of the stand. Such stands are useful and valuable, but the methods of holding the legs in extended and retracted position have not always been satisfactory. For example, some of the stands rely upon wing nuts and bolts that must be adjusted to hold the legs in extended or retracted position. When the metals of the wing nuts and bolts get rusty or dirty, as they frequently do, it is difficult to adjust those nuts and bolts to hold the legs properly. Other constructions depended upon springs to hold the legs in position, but the use of springs is unsightly and it oftentimes leads to undesirable yielding of the legs. Still other methods required the user to grasp all of the legs of the stand at one time and lock them in extended or retracted position. For these various reasons, prior stands which had legs that telescoped into parallel relation with the supports of the stands have not been completely satisfactory. The present invention obviates these difficulties by providing a collapsible stand wherein each of the legs can be moved individually to and out of retracted position. The user need concern himself with only one leg at a time and thus all persons, regardless of their dexterity, can use this novel stand. It is therefore an object of the present invention to provide a collapsible stand wherein each of the legs can be individually moved into and out of retracted position.

The legs of the collapsible stand provided by the present invention are held by a frictional engagement between a retaining ring on the support of the stand and the legs of that stand. This frictional engagement is assured by having slots in the retaining ring disposed at an angle to the normal disposition of the legs; the user twisting the legs slightly as they are inserted in the slots. It is therefore an object of the present invention to provide a retaining ring for a collapsible stand which has slots that are disposed at an angle to the normal position of the legs of the stand.

The collapsible stand provided by the present invention provides a latch which is wholly out of engagement with the legs of the stand when the legs are in retracted position. It is therefore an object of the present invention to provide a latch for the legs of a collapsible stand which is wholly out of engagement with those legs whenever those legs are in retracted position.

The latch provided by the present invention has undercut surfaces which selectively engage the legs of the collapsible stand, and the undercutting of those surfaces enables the latch to move into tighter latching arrangement when outward pressure is exerted on the legs. It is therefore an object of the present invention to provide a latch for the legs of a collapsible stand which has undercut portions to engage those legs.

Other and further objects and advantages of the present invention should become apparent from an examination of the drawing and accompanying description.

In the drawing and accompanying description a preferred embodiment of the present invention is shown and described but it is to be understood that the drawing and accompanying description are for the purpose of illustration only and do not limit the invention and that the invention will be defined by the appended claims.

In the drawing:

Fig. 1 is a side elevational view of a collapsible stand that is made in accordance with the principles and teachings of the present invention, Fig. 2 is a bottom cross sectional view of the stand of Fig. 1 and it is taken along the plane indicated by the line 2—2 in Fig. 1, and Fig. 3 is a bottom view of the stand of Fig. 1 and it is taken along the plane indicated by the line 3—3 of Fig. 1.

Referring to the drawing in detail, the numeral 10 denotes the support of a collapsible stand that is made in accordance with the principles and teachings of the present invention. That support takes the form of a hollow tube but it could readily be made as a solid rod if desired. This tube can receive a number of different devices at the top thereof, as for example, a microphone, a rack for music, a top for a clothes dryer, and many other such devices. The lower end 12 of the support 10 has a plurality of pairs of spaced apart faces that define generally radially arranged grooves 14.

Three legs 16 are provided for the stand of the present invention, and two of the opposed faces of each of the legs are wide and flat, and those faces abut the walls of the grooves 14. The legs 16 are bent so the major portions of the legs project outwardly from the support 10 while the inner ends of the legs lie within the grooves 14. The inner ends of the legs 16 have openings in register with openings 19 in the side walls of the grooves 14 and receive rivets 18. These rivets permit those legs to rotate close to support 10 and to rotate to the extended position.

The numerals 20 denote the radially-extending webs of a latch pivotally secured to the stand by a rivet 24. The webs 20 carry circumferentially-extending fingers 22 with undercut inner surfaces. The fingers 22 can overlie and engage the inner ends of the legs 16 of the stand when those legs are in extended position. The latch can be rotated out of engagement with the legs and the legs can be rotated to extended position. At such time the latch will be wholly out of engagement with the legs 16 and those legs will be free to twist throughout their entire lengths. The circumferentially-extending fingers 22 are shorter than the spaces between adjacent grooves 14 to permit those fingers to face the legs 16. Once the legs have been moved into extended position, it is only necessary to rotate the latch to lock those legs in position. When the stand is set on the floor, the weight of the stand will tend to cause the legs 16 to rotate toward retracted position. Any such movement will be positively resisted by the fingers 22, and the undercut inner surfaces of those fingers will force the latch into even tighter latching engagement with the legs.

A retaining ring 26 is secured to and acts as part of the support 10. This ring has slots 28 extending inwardly from the periphery thereof and the slots are just wider than the thicknesses of the legs 16. The slots 28 are disposed above and in register with the grooves 14, but the planes of the slots 28 are disposed at small angles to the planes of the grooves 14. Moreover, the planes of the slots 28 coact with the pivots 18 to define angles that are greater than eighty degrees but are less than ninety degrees. With this construction, it is necessary to twist the outer ends of the legs 16 before they can fully enter the slots 28. The legs will be of resilient material, such as metal, and they will tend to restore themselves to normal, unstressed position. This restorative tendency provides sufficient frictional engagement between the walls of the slots 28 and the wide flat sides of the legs 16 to hold those legs against accidental dislodgement from the slots 28. However, the angle is such that the legs can easily be removed from the slots 28 by the exertion of moderate forces that are entirely within the capabilities of almost all persons. The spacing of the retaining ring 26 adjacent the upper end of the support 10 and the securement of the legs 16 to the support 10 adjacent the bottom thereof, enables the full length of the legs 16 to yield and then tend to restore the legs to normal, unstressed position. This distributes the twisting action along the full length of the legs 16 and thus avoids localized fatiguing of those legs. As a result, the collapsible stand provided by the present invention is both sturdy and has a long life. In practice, the legs twist readily as they are pressed into the slots.

Whereas the drawing and accompanying description has shown and described a preferred embodiment of the present invention, it should be apparent to those skilled in the art that various changes may be made in the form of the invention without affecting the scope thereof.

What I claim is:

1. In a collapsible stand which has a central vertical support, a plurality of legs, and a plurality of pivots that secure the inner ends of each of said legs to the lower end of said support, said pivots confining the said inner ends of said legs so said inner ends of said legs pivot in a plane perpendicular to said pivots, said pivots being transverse of said support so the outer ends of said legs can rotate close to said support and can also rotate away from said support to an extended position, the improvement which comprises a latch for said legs that overlies the inner ends of said legs in one position of said latch and clears said inner ends of said legs in another position of said latch, and spaced apart surfaces on said support that are grouped in pairs and that extend generally radially of said support to define a plurality of substantially vertical slots that are spaced above the level of the pivots, a distance less than the length of one of said legs and that are spaced above the level of said latch, said spaced apart surfaces remaining fixed on said support during the extending and retracting of said legs of said collapsible stand, said slots selectively receiving said outer ends of said legs, said slots being just wider than the thicknesses of the outer ends of said legs, said slots opening outwardly away from said support, the planes of said slot forming surfaces being displaced from the plane of swing of said legs to cause distortion and consequent binding of said legs as the outer ends thereof are moved into said slots, said latch being wholly spaced from said legs whenever the outer ends of said legs are in said slots, whereby the tendency of said legs to return to normal unstressed position can act to bind said legs against accidental movement out of retracted position.

2. In a collapsible stand which has a central support, a plurality of legs, and a plurality of pivots that secure the inner ends of each of said legs to the lower end of said support, said pivots being transverse of said support so the outer ends of said legs can rotate close to said support and can also rotate away from said support to an extended position, the improvement which comprises a plurality of pairs of spaced apart faces on said support that define a plurality of grooves at the lower end of said support to receive the inner ends of the said legs and to coact with said pivots to guide the rotation of said legs, said faces being generally radially arranged to define generally radially arranged planes for said grooves, said pivots spanning and being transversely disposed of the said planes for said grooves, a latch for said legs, a pivot that rotatably secures said latch to the lower end of said support, said pivot for said latch having the axis thereof parallel to the said planes for said grooves, said latch having generally radially extending webs and generally circumferentially-extending fingers, said fingers of said latch being dimensioned to overlie and obstruct said grooves in one position of said latch and to clear and be out of registry with said grooves in another position of said latch, the inner surfaces of said fingers of said latch selectively engaging said legs to latch said legs within said grooves, the inner surface of each of said fingers being undercut so said inner surface can coact with an adjacent side of the web to define an acute angle whereby outward pressure on said legs urges said latch into tighter latching engagement with said legs, said support having a retaining ring thereon that is spaced above the level of said pivots a distance less than the length of one of said legs, and a plurality of pairs of spaced apart faces on said retaining ring that define elongated slots in said retaining ring to receive the outer ends of said legs, said faces on said retaining ring defining generally radially arranged planes for said slots, said slots opening to the outer periphery of said retaining ring, said slots being just wider than the thicknesses of the outer ends of said legs, said grooves and said slots being generally in vertical registry but having the planes thereof displaced to subtend small angles and thereby cause twisting of said legs as the outer ends thereof are moved into said slots, said latch being wholly spaced from said legs whenever the outer ends of said legs are in said slots, whereby said legs are free to twist toward normal unstressed position, said retaining ring remaining fixed on said support during rotation of said legs.

3. In a collapsible stand which has a central support, a plurality of legs, and a plurality of pivots that secure the inner ends of each of said legs to the lower end of said support, said pivots being transverse of said support so the outer ends of said legs can rotate close to said support and can also rotate away from said support to an extended position, the improvement which comprises a latch for said legs, a pivot that rotatably secures said latch to the lower end of said support, said latch having fingers dimensioned to overlie the inner ends of said legs in one position of said latch and to clear said inner ends of said legs in another position of said latch, said fingers selectively engaging and latching said legs against movement, said support having a retaining ring thereon that is spaced above the level of said pivots a distance less than the length of one of said legs, said retaining ring remaining fixed on said support during the extending and retracting of said legs, and a plurality of pairs of spaced apart faces on said retaining ring that define slots to receive the outer ends of said legs, said slots being just wider than the thicknesses of said outer ends of said legs, said slots opening to the outer periphery of said retaining ring, said faces defining planes for said slots which are displaced from the axes of said pivots to define angles that are greater than eighty degrees but are less than ninety degrees and that cause twisting of said legs as the outer ends thereof are moved into said slots, said latch being wholly spaced from said legs whenever the outer ends of said legs are in said slots, whereby said legs are free to twist toward normal unstressed position.

4. In a collapsible stand which has a central support, a plurality of legs, and a plurality of pivots that secure the inner ends of each of said legs to the lower end of said support, said pivots being transverse of said support so the outer ends of said legs can rotate close to said support and can also rotate away from said support to an extended position, the improvement which comprises a retaining ring that is mounted on said support and is spaced above the level of said pivots a distance less than the length of one of said legs, said retaining ring remaining fixed on said support during the extending and retracting of said legs, and a plurality of pairs of spaced apart faces on said retaining ring that define slots to receive the outer ends of said legs, said slots opening to the outer periphery of said retaining ring, said slots being just wider than the thicknesses of said outer ends of said legs, said faces defining planes for said slots that are displaced from the axes of said pivots to define angles that are greater than eighty degrees but are less than ninety degrees and that cause twisting of said legs as the outer ends thereof are moved into said slots.

5. In a collapsible stand which has a central support, a plurality of legs, each of said legs having two wide, flat, parallel faces, and a plurality of pivots that secure the inner ends of each of said legs to the lower end of said support, said pivots being transverse of said support so the outer ends of said legs can rotate close to said support and can also rotate away from said support to an extended position, the improvement which comprises a plurality of pairs of surfaces on said support that are spaced from said pivots a distance less than the length of one of said legs, the surfaces of each of said pairs of surfaces being spaced apart to define slots, said surfaces defining planes for said slots that are generally radially arranged, said slots being directed and opening outwardly from said support, said slots having widths closely approximating the thicknesses of said legs and said slots selectively receiving said legs, said planes of said slots being displaced from the axes of said pivots to define angles that are greater than eighty degrees but are less than ninety degrees and that cause twisting of said legs as the outer ends thereof are moved into said slots.

References Cited in the file of this patent

UNITED STATES PATENTS

| | | |
|---|---|---|
| 227,152 | Crocker | May 4, 1880 |
| 229,622 | Mansfield | July 6, 1880 |
| 564,397 | Stickney | July 21, 1896 |
| 704,619 | Cramer | July 15, 1902 |
| 1,374,783 | Tiencken | Apr. 12, 1921 |
| 1,570,216 | Garrett et al. | Jan. 19, 1926 |
| 2,361,781 | Lindsey et al. | Oct. 31, 1944 |
| 2,621,802 | Stover | Dec. 16, 1952 |